UNITED STATES PATENT OFFICE.

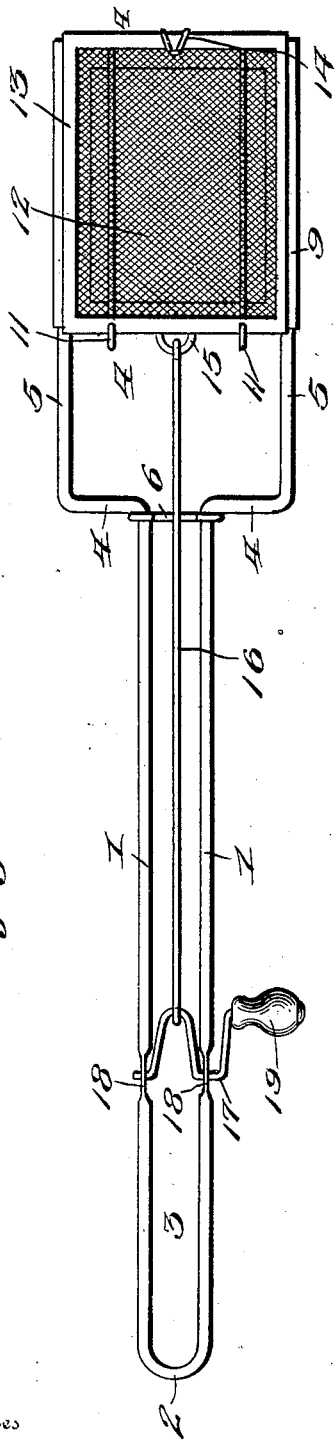

GEORGE WINN HANCOCK, OF BIRMINGHAM, ALABAMA.

CORN-POPPER.

No. 829,781.  Specification of Letters Patent.  Patented Aug. 28, 1906.

Application filed July 11, 1905. Serial No. 269,225.

*To all whom it may concern:*

Be it known that I, GEORGE WINN HANCOCK, a citizen of the United States of America, residing at Birmingham, in the county of Jefferson and State of Alabama, have invented new and useful Improvements in Corn-Poppers, of which the following is a specification.

This invention relates to improvements in corn-poppers; and its object is to provide simple and effective means for reciprocating the corn basket or receptacle, such means being so mounted as to be conveniently manipulated by one hand while the other hand is employed to hold the popper.

Another object is to provide a corn-popper which is strong and durable and adapted to be manufactured and sold at a comparatively low cost.

The preferred embodiment of the invention is illustrated in the accompanying drawings, in which—

Figure 1 is a top plan view of the corn-popper. Fig. 2 is a side elevation thereof, and Fig. 3 is an outer or rear elevation of the corn basket or receptacle.

In carrying my invention into practice I provide a combined supporting frame and handle formed of a single piece of stiff wire, the wire being bent upon itself intermediate of its length to form a pair of parallel side arms 1, connected at their outer ends by the intermediate or return portion 2 to form a handle or grip portion 3. At their inner or forward ends the arms 1 are bent or laterally deflected to form connecting members 4 and thence continued forwardly in a plane parallel with the arms to provide a widened supporting and guide frame for the corn basket or receptacle, said frame being formed by guiding and supporting terminals 5. The frame thus formed is open at its forward end and closed at its rear end by the connecting members 4 and a transverse brace 6, connecting and reinforcing the arms 1 immediately in rear of said connecting members.

The corn basket or receptacle comprises a frame 7, of wire or other suitable perforate or reticulate material, said frame being stiffened at its mouth or open upper portion by a surrounding sheet-metal rim 8, formed on opposite sides of the basket-body, with guide sleeves or loops 9 slidably engaging the guiding and supporting members 5. The body 7 is reinforced on opposite sides of its longitudinal center by brace-wires 10, which are bent upwardly at the ends thereof and connected with the ends of the rim 8, the inner or rear ends of the wires being looped to form hinge members 11 for the basket-cover 12. The cover 12 comprises a body of perforate or reticulate material having a sheet-metal stiffening-rim 13, apertured at its inner or rear end to receive the hinged members 11, whereby the cover is adapted to be swung open and closed. The body 7 is formed at its outer or forward end with a hinged catch 14, adapted to be swung inward to engage the outer end of the rim of the cover to hold the cover in closed position.

The basket-body 7 is formed or provided at its inner or rear end with an eye 15, to which is pivotally connected the outer end of a crank or pitman 16, which extends rearwardly between and in a plane parallel with the arms 1 and is connected at its rear end to the crank portion of an operating-shaft 17, journaled in bearing-openings formed in flattened portions 18 of the frame-wire at the intersection of the sides of the grip or handle 3 with the arms 1. One end of the shaft is provided with an actuating-handle 19, whereby it may be rotated to impart reciprocatory movement to the basket or receptacle, which slides back and forth on the guiding and supporting members 5.

In operation the basket 7 is filled with a charge of corn and the handle 3 grasped in one hand to support the device, while the other hand is employed to actuate the crankshaft. The basket is then held over a fire or flame and reciprocated through the medium of its operating means to effect the popping of the corn. It will thus be seen that the device is constructed in such manner as to permit of its being conveniently supported and operated and manufactured at a comparatively low cost.

Having thus described the invention, what is claimed as new is—

1. A corn-popper comprising a supporting-frame formed of a single piece of wire, said frame being bent intermediately upon itself to form a handle and a pair of parallel arms, said arms being bent to form laterally-projecting portions and rebent to form supporting and guide members lying laterally beyond the same and in planes parallel therewith, a basket mounted to reciprocate upon said guide members, an operating device supported by the arms, and a connecting-rod extending on a plane between the arms and connected with the basket and operating device.

2. A corn-popper comprising a supporting-frame formed of a single piece of wire, said frame being bent to form a handle, a pair of spaced supporting-arms, and spaced guide members at the free ends of said arms, said guide members being spaced a greater distance apart than the arms, a basket arranged between and mounted to reciprocate upon the guide members, and operating means including an actuating device disposed between the handle and arms for reciprocating said basket.

3. A corn-popper comprising a supporting-frame formed of a single piece of wire, said frame being bent intermediately upon itself to form a handle and a pair of parallel arms, said arms being bent to form laterally-projecting portions and rebent to form supporting and guide members lying laterally beyond the same and in planes parallel therewith, a basket mounted to reciprocate upon said guide members, a crank-shaft journaled in the arms, and a connecting-rod extending on a plane between the arms and terminally connected with the basket and crank-shaft.

In testimony whereof I affix my signature in presence of two witnesses.

GEORGE WINN HANCOCK.

Witnesses:
PHILIP B. CHEANEY,
EMIL SCHLAMP.